United States Patent [19]

Grattarola et al.

[11] Patent Number: 4,884,464
[45] Date of Patent: Dec. 5, 1989

[54] DRIVING DEVICE FOR EXTENDING AND WITHDRAWING OPERATIVE MEMBERS OF A SPACE VEHICLE

[75] Inventors: Maurizuo Grattarola; Domenico Stella, both of Rome, Italy

[73] Assignee: Contraves Italiana S.p.A., Rome, Italy

[21] Appl. No.: 205,118

[22] Filed: Jun. 10, 1988

[30] Foreign Application Priority Data

Sep. 29, 1987 [IT] Italy ............................ 22056 A/87

[51] Int. Cl.$^4$ ........................................... F16H 21/40
[52] U.S. Cl. ............................................ 74/50; 74/2;
74/46; 74/48; 185/37; 244/173
[58] Field of Search ................... 74/46, 48, 45, 47, 49,
74/50, 2; 244/173; 185/37

[56] References Cited

U.S. PATENT DOCUMENTS

| | | | |
|---|---|---|---|
| 3,460,992 | 8/1969 | Avilov et al. | 244/173 X |
| 3,587,999 | 6/1971 | Miniovitch | 244/173 X |
| 4,561,614 | 12/1985 | Olikara et al. | 244/173 |
| 4,641,798 | 2/1987 | DeHaan et al. | 244/173 |

FOREIGN PATENT DOCUMENTS 3215431 10/1983 Fed. Rep. of Germany ...... 244/173
231049 2/1944 Switzerland ........................... 74/48

Primary Examiner—Allan D. Herrmann
Assistant Examiner—Janice E. Chartoff
Attorney, Agent, or Firm—Darcy, Donovan & Coleman

[57] ABSTRACT

A rotatable arm carrying an operative member is pivoted on a main housing (10) for movement between a rest position and a work position. A rotary shaft (28) is also journaled in the housing and can be driven by a wound spring (34) for rotary movement, which is transformed into a reciprocating, partial rotation of the arm by a linkage comprising meshing gears (18, 22) on the arm and on a fixed axis, and a crank and slotted link (24, 26, 30) between said shaft and the gears. A first and a second locking units (12, 14) are mounted stationarily with respect to the housing, each comprising a spring-biased pawl (40, 42) to engage the arm when it reaches said rest position and said work position, respectively, and each being releasable by an external control.

3 Claims, 1 Drawing Sheet

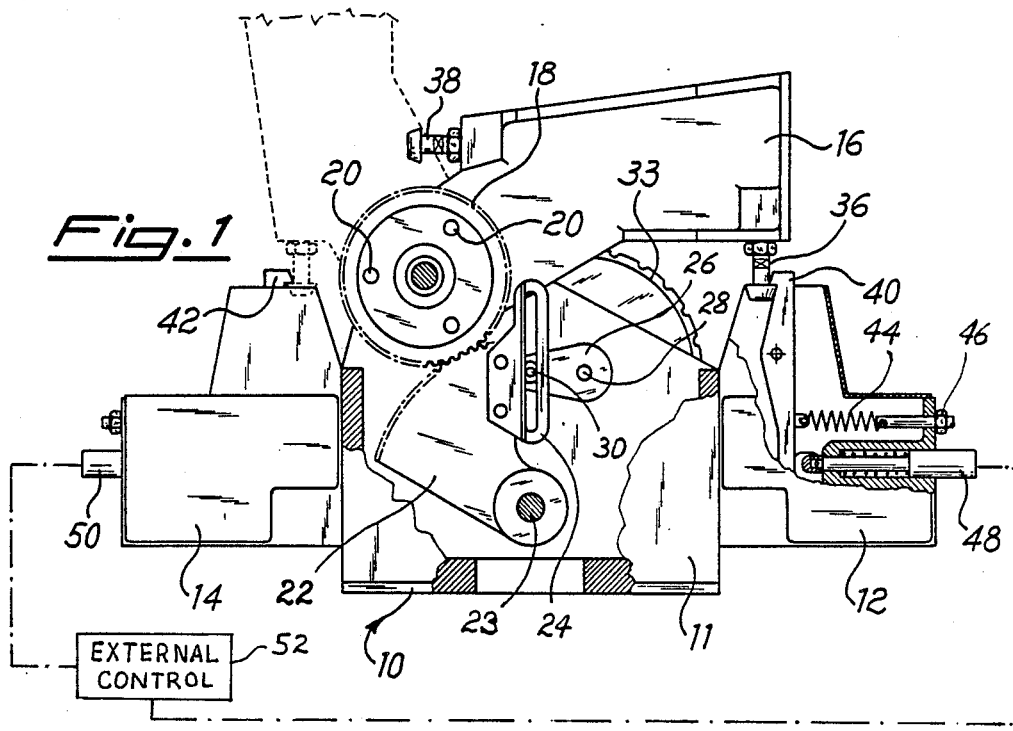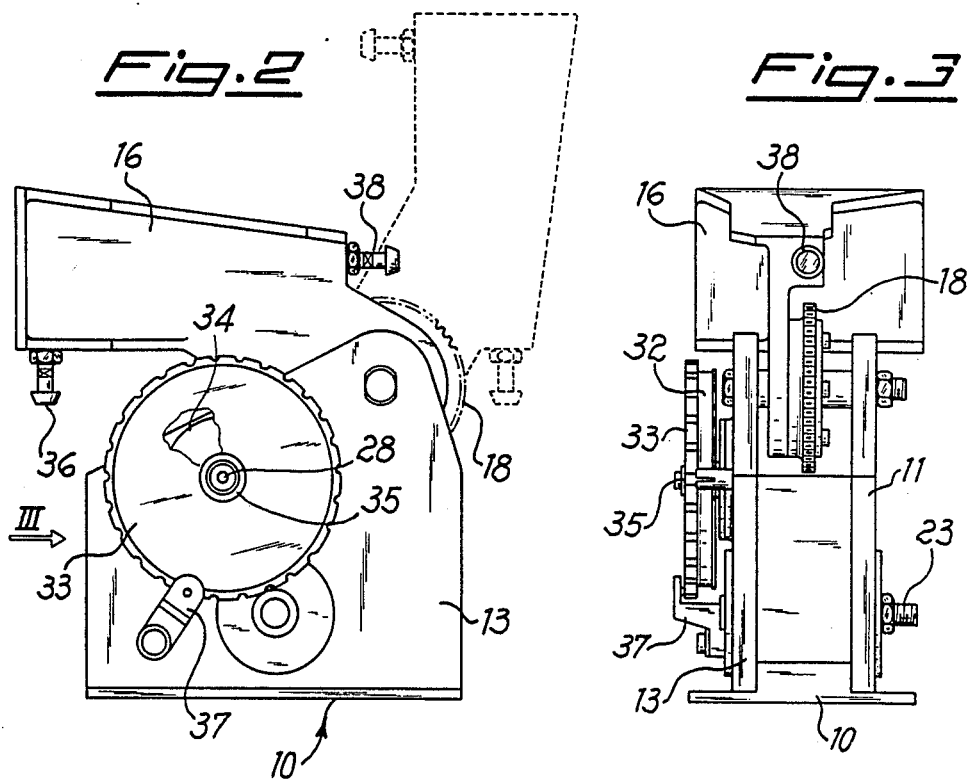

DRIVING DEVICE FOR EXTENDING AND WITHDRAWING OPERATIVE MEMBERS OF A SPACE VEHICLE

BACKGROUND OF THE INVENTION

This invention relates to a drive mechanism for unfolding and folding, from a withdrawn position to an extended position and viceversa, external appendages of orbiting space vehicles, such as instruments, probes and other operative members. The peculiarity of the mechanism resides in its ability to perform the above described movements by means of purely mechanical actuators, not requiring electrical power for carrying out its tasks.

Unfolding devices for space applications are known which are based on spring-operated mechanisms, designed for one-shot operation. Once the vehicle had been launched to its final operational orbit, a radiosignal or other event was used to trigger a spring-retaining member to free the spring and allow the desired external probes to be unfolded. A big advantage of such one-shot devices was their simplicity and reliability, while their greatest limitation was—as is easily understandable—their inability to reverse the operation and/or to repeat the probe extension, though this limitation was usually no problem in the first days of orbiting systems.

However, with the onset of space transportation systems and the construction of large orbiting stations, the operational life of space systems—of increasing cost and size—has become longer, while maintenance and service in orbit has been introduced. Therefore, a need has arisen in some cases that the systems, before undergoing maintenance operations, be capable of autonomously resuming their launch configuration—by withdrawing their external appendages—so that they can be taken onboard interorbital transportation vehicles or the like.

The mechanical power for withdrawing said appendages, by moving them in a direction opposite to the unfolding movement, has been heretofore generally supplied by electric motors. This approach involves the installation of complex and bulky members, such as the motor itself, an electric power source such as a battery, and a system of switches to change the polarity in the motor supply, together with a decoding facility to allow different "unfolding" and "folding" signals to be recognized in the space vehicle. Moreover, such devices are inherently more prone to breakdown than the simple, mechanical "one-shot" mechanisms previously used.

SUMMARY OF THE INVENTION

It is now a main object of this invention to provide an unfolding device for probe appendages in space vehicles or the like for repeated folding and unfolding movement of such appendages, which is simple and reliable and which does not require a battery or other source of electric power for its operation.

It is another object to combine the advantages of simplicity and reliability of "one-shot" mechanisms and the multifunctional capability of electrically operated ones.

The above and other objects, such as will appear from the following disclosure, are achieved by the invention by providing a driving device for extending and withdrawing operative members of a space vehicle, having a main housing and at least one rotatable, member-carrying arm pivoted on the housing for movement between a rest position and a work position, characterized in that it comprises:

(a) a rotary shaft journaled in the housing and drivable by wound spring means on the main housing for continuous rotary movement;

(b) a link mechanism connecting said rotary shaft to said arm, for transforming the continuous movement of the shaft into a reciprocating, partial rotation of the arm;

(c) a first and a second locking unit mounted stationarily with respect to the housing, each comprising a spring-biased pawl to engage the arm when it reaches said rest position and said work position, respectively, and each being releasable by an external control.

BRIEF DESCRIPTION OF THE DRAWINGS

The invention will be best understood from the following detailed description, given merely by way of nonlimiting example, of a preferred embodiment, with reference to the accompanying drawings, wherein:

FIG. 1 is a front view of a driving device according to the invention, partly broken away to show its internal structure;

FIG. 2 is a back view of the device of FIG. 1, with its locking units removed for simplicity; and FIG. 3 is a side view of the same device with its locking units removed, taken in the direction of arrow III of FIG. 2.

DESCRIPTION OF THE PREFERRED EMBODIMENTS

With reference to the Figures of the drawings, the driving device according to the invention comprises a hollow main housing 10 having a front wall 11 and a back wall 13, and carrying two identical lateral locking units 12, 14. An arm 16 is journaled on the main housing to be rotatable between a rest position shown in full lines and a work position shown in dashed lines, the two positions being 90 degrees apart. A gear 18 is coaxially fastened to arm 16 by screws 20. Arm 16 is intended for carrying appendages such as probes, instruments, or other operative members (not shown), in a way obvious for a person skilled in the art.

A gear section 22 is journaled around a fixed axis 23 within housing 10, in meshing engagement with gear 18, and carries an integral slotted member 24. A crank 26 is keyed to a shaft 28 which is also journaled in the walls of the housing and carries a pin 30 which is slidably coupled in the slot of member 24. Behind the back wall 13 of housing 10, shaft 28 carries an integral plate 32. A spiral spring 34 is mounted around shaft 28 with one end fastened to the shaft and the other end fastened to a point near the edge of plate 32. An adjustment plate 33 is fastened with a nut 35 to plate 32, and can be adjusted with respect to the latter, being locked by means of latch 37.

Arm 16 carries two adjustable screws 36, 38, each having a conical head. A pawl 40, or 42 is hinged within each of locking units 12, 14, and is biased to a forward position by a helical spring 44 (only one is shown), adjustable by external control means of a nut 46. A pusher rod 48 (or 50) can be pushed by means 52 tilt pawl 40 (or 42) against the bias of spring 44, to disengage pawl 40 (or 42) from either of screws 36, 38.

It appears that, as spring 34 unwinds, crank 26, through the crank-and-slot link with member 24, will drive gear section 22 alternately in opposite directions, so that the gear 18 that is driven by section 22, and consequently arm 16, will be turned alternately forward and back through an angle of about 90 degrees, depending on the gear ratio. Such movement will continue until the spring has completely unwound, which may require several complete folding-unfolding cycles.

However, whenever arm 16 reaches one end of its travel, the conical head of either its screw 36 or 38 will engage either of pawls 40 or 42, and the arm will be locked in the respective folded or unfolded position. Momentarily pushing the respective pusher rod 48 (or both pusher rods together) will free arm 16 to perform another swinging motion to the opposite end of its travel, where again it will be locked by the other locking unit. This operation can be repeated until the energy stored in the wound spring is exhausted.

Thus a continuous rotary motion is transformed into a reciprocating rotary motion by using a crank and slotted link mechanism. The rotary motion is imparted by a preloaded spiral spring to a "crank-like" element rotatable about an axis. This motion is transformed, during the uncoiling of said spring, by means of a slotted coupling between the crank and a gear section (the slotted link) pivoted on another axis, into the rotary motion of said gear section.

One advantage of the above described device is that one control signal is sufficient for causing either the extension or the withdrawal of the arm, as appropriate, thus simplifying the control facilities required.

Several changes may be brought to the preferred embodiment described above. For instance, more than one arm may be provided, for extension of different operative members, to be driven and locked and released by the same basic device. Also, the locking units might have pawls shaped directly on the pusher rods, or might be differently designed. Finally, although a crank and slotted link has been shown by way of preferred example, a different kind of the known mechanisms could be used which are capable of transforming a continuous rotary movement into a reciprocating one.

We claim:

1. A driving device for extending and withdrawing operative members of a space vehicle, having a main housing (10) and at least a rotatable, member-carrying arm (16) pivoted on the housing for movement between a rest position and a work position, comprising:
    (a) a rotary shaft (28) journaled in the housing and drivable by wound spring means (34) for continuous rotary movement;
    (b) a link mechanism (18, 22, 24, 26, 30) connecting said rotary shaft to said arm, for transforming the continuous movement of the shaft into a reciprocating, partial rotation of the arm;
    (c) a first and a second locking units (12, 14) mounted stationarily with respect to the housing, each comprising a spring-biased pawl (40, 42) to engage the arm when it reaches said rest position and said work position, respectively, and each being releasable by an external control.

2. The device of claim 1, wherein said mechanism comprises a gear (18) coaxially fastened to said arm, a gear section (22) journaled on said housing and in meshing engagement with said gear, and a crank and slotted link (24, 26, 30) connecting said shaft to said gear section.

3. The device of claim 2, wherein said cranck and slotted link comprises a slotted member (24) fastened to said gear section and a crank (26) keyed to said shaft and having a pin (30) in sliding engagement with said slotted member.

* * * * *